Patented Dec. 19, 1939

2,183,929

UNITED STATES PATENT OFFICE 2,183,929

SULPHONATION PRODUCT

Albert Frank Bowles, Jersey City, and Saul Kaplan, Teaneck, N. J., assignors to The Richards Chemical Works, Incorporated, Jersey City, N. J., a corporation of New Jersey No Drawing. Application July 9, 1936, Serial No. 89,764

4 Claims. (Cl. 260—401)

This invention has for its object the production of certain novel condensation products of organic acids and aldehydes and derivatives of such condensation products, the process of making the same and particular industrial applications thereof.

The acids used may be mono-basic or polybasic aliphatic acids, having not less than three carbon atoms, the di-basic acids being preferred, or aromatic carboxylic acids containing at least one $CH_2$ or $CH_3$ group. For example, the mono-basic aliphatic acids, pelargonic, hydroxy pelargonic and sorbic, may be used. Of the di-basic acids, the following are suitable: malic, maleic, malonic, tartaric, succinic, azelaic suberic and sebasic acids. Citric is an example of a tri-basic acid. Of the aromatic acids, toluic and methyl phthalic acids may be used.

The aldehydes may be aliphatic aldehydes having from 2 to 18 carbon atoms in the chain, whether saturated or unsaturated, straight or branched chain. Aromatic aldehydes may also be used. Of the saturated aliphatic aldehydes, the aldehydes corresponding to the following acids may be used: acetic, propionic, butyric, valeric, caproic, heptoic, octoic, pelargonic, capric, lauric, myristic, palmitic and stearic. Unsaturated aldehydes, such as those corresponding to crotonic, undecylenic and oleic acids, are, for some purposes at least, preferable to the saturated aldehydes. Benzaldehyde and homologues thereof may be employed.

The above limits of 2 to 18 carbon atoms, set for the aliphatic aldehydes, while not given with any special reference to the aromatic aldehydes, does in fact include the most useful of the latter. The simplest aromatic aldehyde, benzaldehyde, has 7 carbon atoms, and little advantage is gained by the use of aromatic aldehydes having more than 18 carbon atoms.

The products of the reaction between the acids and aldehydes are what will be termed hereafter primary products. Such primary products may be converted into a series of secondary products by condensing them with either:

(1) Amino-type compounds, that is, primary or secondary amines or substances which on tautomeric change yield primary or secondary amino groups, such as ammonia, urea, thiourea, homologues thereof and their isomers, proteins including peptones, casein, glue, gelatine, and albumen, amines or alkyl or aryl amines, peptides and polypeptides.

(2) Hydroxy compounds, such as aromatic or aliphatic alcohols, and carbohydrates.

(3) Alkyl oxides, such as propylene oxide.

The invention also includes a series of tertiary products produced by treating any of the above secondary products with a sulphuric type acid or by treating secondary products (1) or (2) above with an alkyl oxide, such as propylene oxide.

The condensation of equal molecular parts of an acid and an aldehyde may be illustrated by the reaction between malonic acid and croton aldehyde. It involves the splitting off of water by the combination of two hydrogens of the acid with the oxygen of the aldehyde group, as shown by the following equation:

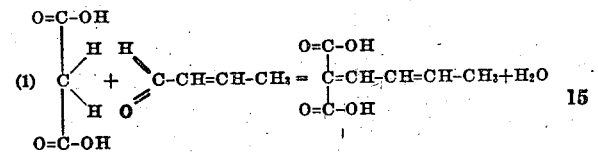

It will be understood that in this and in succeeding equations and structural formulae applicants are merely giving what they believe to be the reactions and structures of the resulting products. It is intended that the specification and claims shall protect the products of the reactions, even though the precise structures of such products may later be shown to be other than those indicated in this specification.

If two molecular parts of croton aldehyde are used, the additional molecule of croton aldehyde links itself to the terminal $-CH_3$ group of the above acid as follows:

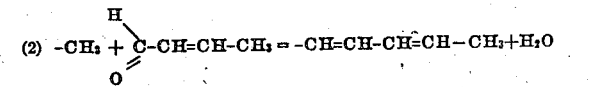

To prepare the above mono-molecular condensation product, 104 parts of malonic acid, dissolved in 200 parts of a neutral solvent such as benzene, toluene, xylene, pyridine, aniline, methyl aniline, methyl alcohol or ethyl ether, 70 parts of croton aldehyde and 40 parts sodium hydroxide to act as a catalyst, are heated with stirring for an hour under efficient refluxing. The solvent is then distilled off and the residue washed with 100 parts of hydrochloric acid.

To prepare the above di-molecular condensation product there is added to the reaction vessel after the hour of heating a further 70 parts of croton aldehyde and the heating continued for another hour. The separation of the resulting acid condensate is then carried out as described above.

Malonic acid has only one $-CH_2$ group. With acids having more than one $-CH_2$ group, additional molecular proportions of aldehyde may react with an additional $-CH_2$ group or groups of the acid rather than with the terminal $-CH_3$ group of the aldehyde claim, as in Equation 2. This may be illustrated by the reaction between one molecular part of sebacic acid and three molecular parts of croton aldehyde. The resulting product appears to have substantially the structure:

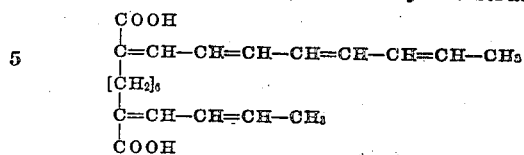

It is possible that part or all of the product has a structure similar to that given below:

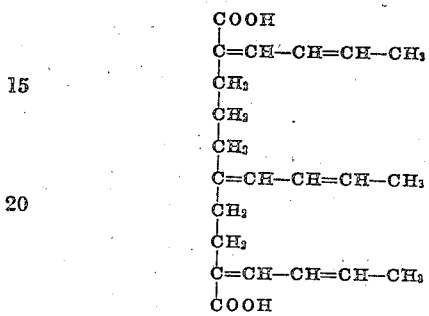

On the other hand, the iodine number of the product obtained by reacting one mol of succinic acid with two mols of octyl aldehyde indicates that its probable structure is:

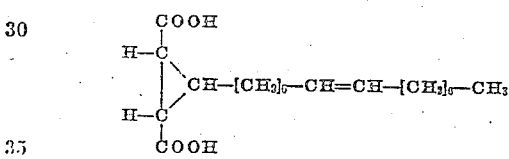

The condensation of the primary products with amino-type compounds may be illustrated by the reaction between urea and the acid resulting from above Reaction 1. This urea condensation involves the union of one hydrogen of each amino group of the urea with one of the —OH parts of the carboxylic groups of the acid to form water, as indicated by the following reaction:

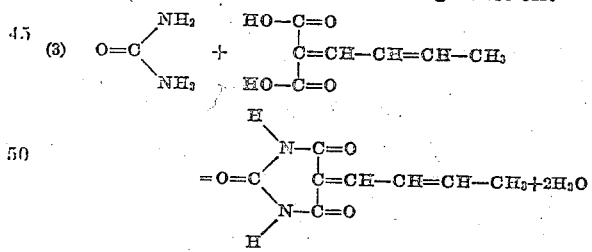

This reaction may be brought about by heating equimolecular parts of the initial materials at 135–140° C. as long as water continues to be given off.

Similar condensations may be made with thiourea and the above malonic acid derivative or the derivatives of other acids, such as sebacic acid.

Using ammonia, an analogous reaction occurs with the —COOH groups, as indicated by the reaction:

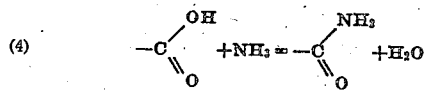

This reaction can be brought about by adding a neutral solvent, such as methyl alcohol, to the acid-aldehyde condensate, cooling, saturating with ammonia and allowing the mixture to stand in a closed vessel for 24 hours. At the end of that time the reaction is complete and the methyl alcohol and any excess ammonia may be distilled off.

Valuable products for use in textile and leather treatment and finishing can be made by condensing the primary products with casein, gelatine, peptones, peptides and other like materials, and subsequently sulphonating.

For example, to 363 parts of the above described sebacic acid—croton aldehyde condensate, may be added 150 parts of casein dissolved in 190 parts of para-tertiary amyl phenol. To this mixture is slowly added 150 parts of 40% formaldehyde, stirring and cooling during the addition. After about an hour, the mixture is heated to 50–60° C. and maintained at that temperature for 4 to 6 hours. The product may then be sulphonated to increase its water solubility.

The function of the formaldehyde in the above treatment is to aid in the polymerization of the condensate and produce a resinified product.

Condensation with one form of amino-type material, such as urea, may be followed by further condensation with another form of amino type material, such as casein.

For example, 182 parts of the product of Reaction 3 may be added to 100 parts of casein dissolved in 94 parts of phenol. To this mixture, 75 parts of 40% formaldehyde is added, while simultaneously stirring and also cooling slightly to prevent too vigorous reaction. After the first reaction has subsided somewhat the mixture is heated to 50–60° C. and held at that temperature for 4 to 6 hours. A thick viscous material is obtained the structure of which is unknown. This material, after sulphonating to render it water soluble, is a suitable textile and leather processing and finishing assistant.

The condensation of the primary products with hydroxy compounds may be illustrated by the esterification reaction between the acid resulting from Reaction 1 and n-propyl alcohol:

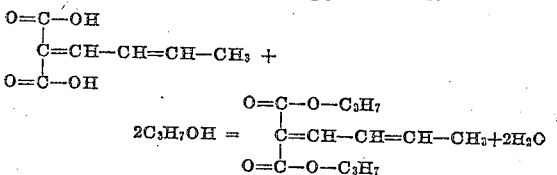

The condensation of the secondary, amino-type condensation products with alkyl oxides may be illustrated by the reaction between the product of Reaction 3 with propylene oxide. In this case the imido hydrogen is labile and joins the oxygen of the oxide to form a hydroxyl group. The product has a structure somewhat as follows:

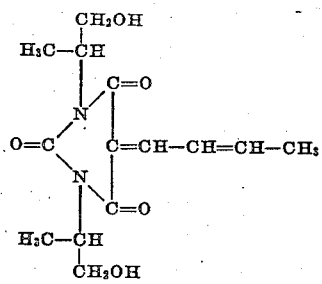

Any of the primary or secondary products above described may be treated with a sulphuric-type acid to increase their solubility either directly or as the result of further treatment with an alkali to form the alkali salts of such material. Where the products are unsaturated, the result of treatment with sulphuric acid will be, strictly speaking, sulphates and not sulphonates. The term sulphonation is intended to cover either or both sulphation or sulphonation.

For use as textile and leather assistants, the sulphates are preferable to the sulphonates, and hence it is preferable to use, as already indicated, unsaturated aldehydes in the preparation of the primary products.

The sulphonating agents used may be sulphuric acid, fuming sulphuric acid, amino sulphonic acid, chlor sulphonic acid, alkyl amino sulphonic acid, etc., all of which are included under the term sulphuric-type acid.

The sulphonation treatment may be exemplified by detailing the procedure in the case of the product of Reaction 2. To 112 parts of such reaction product are slowly added 200 parts of 96% sulphuric acid. The mixture is maintained at a temperature of minus 15 to plus 20° C., and constantly stirred until the product is completely soluble in water. The mixture is then salted out in the usual manner and neutralized with sodium hydroxide and the like.

These sulphonated products and their alkali salts have to a marked degree valuable wetting, penetrating, softening, dye-bath leveling, lime resisting, lime dispersing, foaming, detergent and emulsifying properties, and are particularly suited to the processing, treatment and finishing or fabrication of furs, pelts, leathers and textile products.

It is understood that chemical changes in the products herein described and hereafter claimed may be made, which do not substantially change the properties of such products, without departing from the invention.

What is claimed is:

1. A textile and leather processing assistant, comprising the neutralized sulphonation product of the product obtained by condensing a compound containing at least 1 —$NH_2$ group per molecule with the material obtained from the condensation of an aldehyde containing 2 to 18 carbon atoms per molecule with malonic acid.

2. A textile and leather processing assistant, comprising the neutralized sulphonation product of the product obtained by condensing ammonia with the material obtained from the condensation of oleic aldehyde and malonic acid.

3. A textile and leather processing assistant, comprising the neutralized sulphonation product of the product obtained by condensing urea with the material obtained from the condensation of oleic aldehyde and malonic acid.

4. A textile and leather processing assistant, comprising the neutralized sulphonation product of the product obtained by condensing ammonia with the material obtained from the condensation of undecenoic aldehyde and malonic acid.

ALBERT FRANK BOWLES.
SAUL KAPLAN.